No. 634,524. Patented Oct. 10, 1899.
E. A. FRANKLIN.
MACHINE FOR SPRAYING LIQUIDS AND POWDERS.
(Application filed June 3, 1899.)
(No Model.) 3 Sheets—Sheet 1.
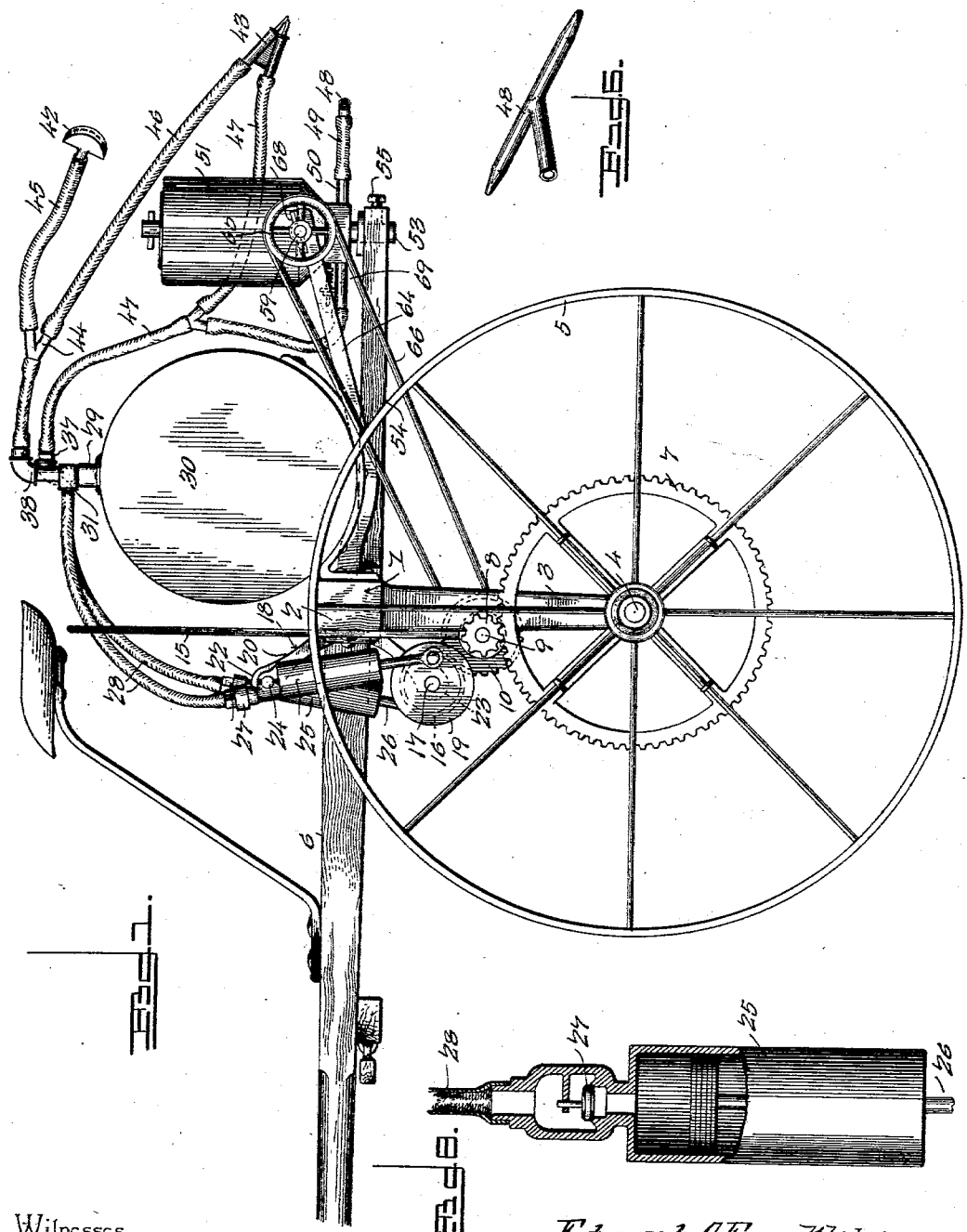
Witnesses
E. F. Stewart
J. H. Riley
Edward A. Franklin, Inventor
By C. A. Snow & Co. Attorneys.

No. 634,524. Patented Oct. 10, 1899.
E. A. FRANKLIN.
MACHINE FOR SPRAYING LIQUIDS AND POWDERS.
(Application filed June 3, 1899.)
(No Model.) 3 Sheets—Sheet 2.
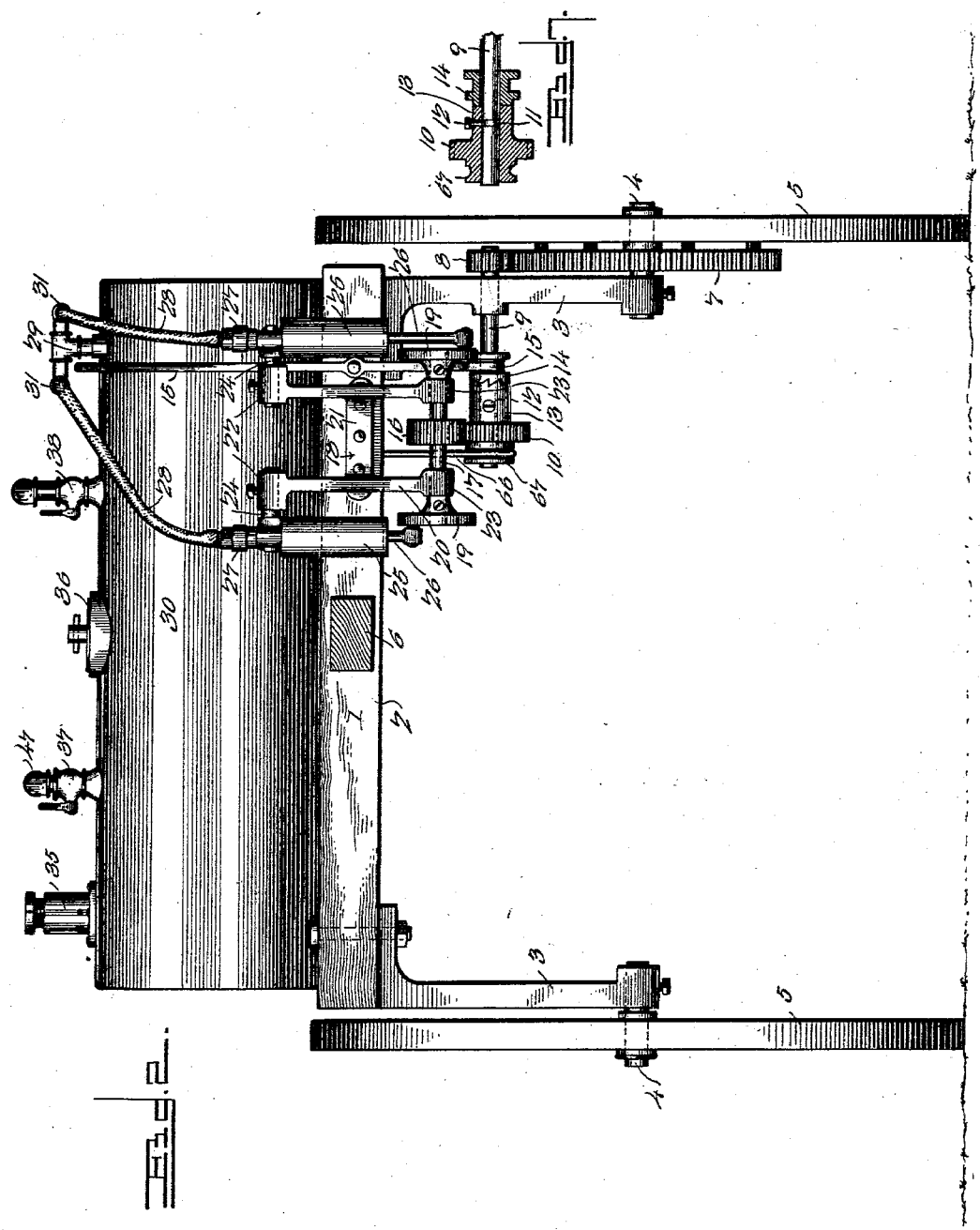
Witnesses
E. E. Stewart
H. J. Riley
Edward A. Franklin, Inventor
By his Attorneys,
C. A. Snow & Co.

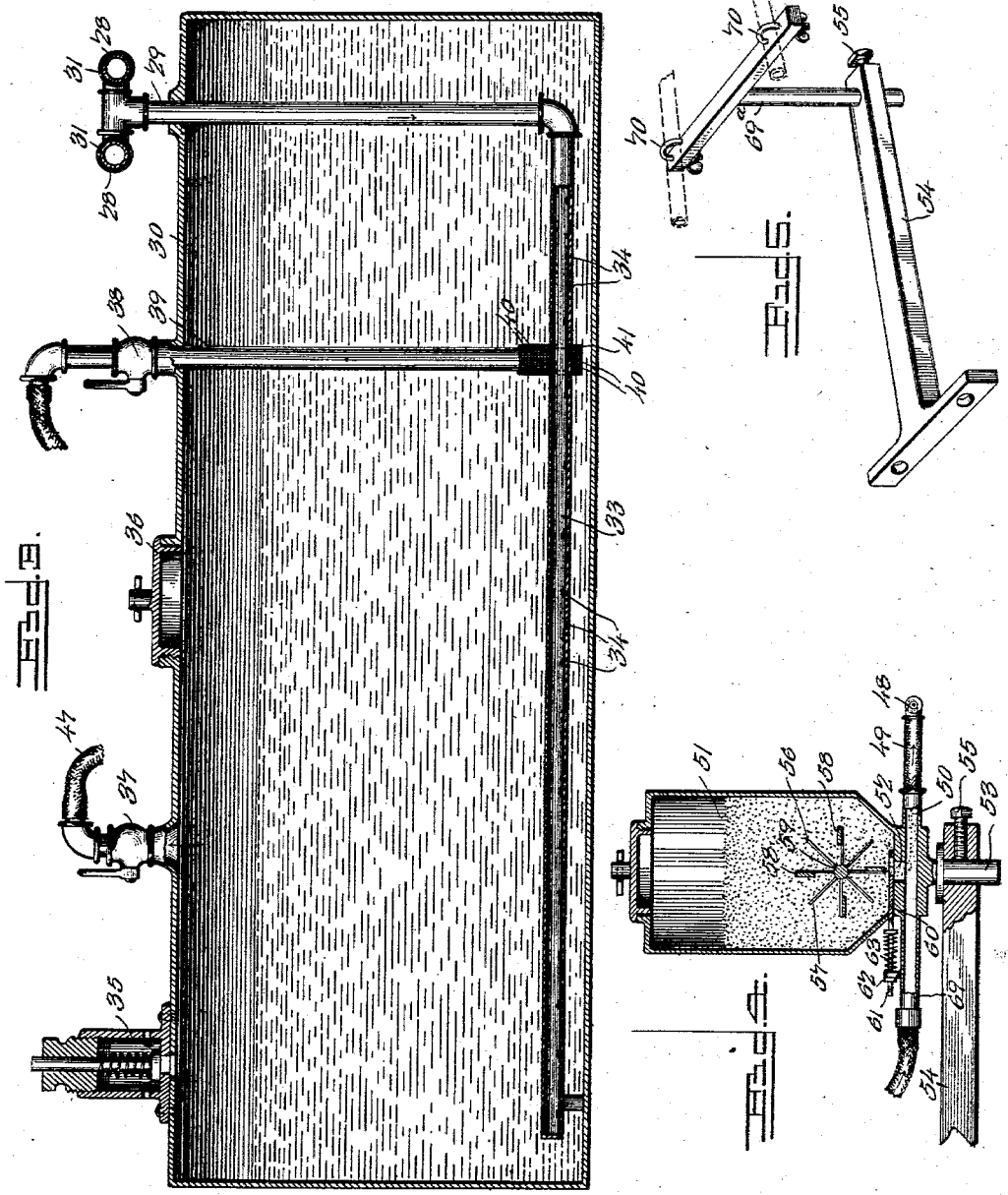

UNITED STATES PATENT OFFICE.

EDWARD A. FRANKLIN, OF AUSTIN, TEXAS, ASSIGNOR TO THE CHICAGO NOVELTY MANUFACTURING COMPANY, OF SAME PLACE.

MACHINE FOR SPRAYING LIQUIDS AND POWDERS.

SPECIFICATION forming part of Letters Patent No. 634,524, dated October 10, 1899.

Application filed June 3, 1899. Serial No. 719,223. (No model.)

*To all whom it may concern:*

Be it known that I, EDWARD A. FRANKLIN, a citizen of the United States, residing at Austin, in the county of Travis and State of Texas, have invented a new and useful Machine for Spraying Liquids and Powders, of which the following is a specification.

The invention relates to improvements in spraying-machines.

The object of the present invention is to improve the construction of spraying-machines and to provide a simple and comparatively inexpensive one designed for irrigation and for destroying insects and capable of spraying both liquid and powder separately or simultaneously.

A further object of the invention is to provide a machine of this character which will have sufficient force to discharge a liquid or a powder advantageously in the heaviest wind.

The invention consists in the construction and novel combination and arrangement of parts hereinafter fully described, illustrated in the accompanying drawings, and pointed out in the claims hereto appended.

In the drawings, Figure 1 is a side elevation of a spraying-machine constructed in accordance with this invention. Fig. 2 is a transverse sectional view. Fig. 3 is a longitudinal sectional view of the tank or reservoir. Fig. 4 is a vertical sectional view of the hopper or receptacle. Fig. 5 is a detail perspective view illustrating the manner of supporting the discharge-tubes. Fig. 6 is a detail view of the powder-discharging nozzle. Fig. 7 is a detail sectional view illustrating the construction of the clutch. Fig. 8 is a detail view of one of the pumps.

1 designates a drop-axle forming a supporting-frame for the machine and preferably consisting of a transverse bar or beam 2 and depending arms 3, bolted or otherwise secured to the bar or beam 2 near the ends thereof and provided with outwardly-extending spindles 4, upon which are mounted carrying-wheels 5. A tongue or pole 6 is connected with the bar or beam 2 for the attachment of draft-animals, and as the machine is drawn over the surface of the ground by them it is operated as herein described.

One of the carrying-wheels 5 has a gear-wheel 7 rigidly connected with its hub; but it may be fixed to the carrying-wheel in any other suitable manner. This gear-wheel 7, which is located between the carrying-wheel and the adjacent arm of the drop-axle, meshes with a pinion 8 of a horizontal shaft 9, journaled in suitable bearings of the adjacent arm 3 of the axle and extending inward therefrom. The inner end of the horizontal shaft 9 has a loose pinion 10 mounted on it, and it is provided with an annular groove 11, which is inclosed by a key or screw 12 of a clutch-section 13, also loose on the horizontal shaft 9. The clutch-section 13, which is fixed to the pinion 10, is adapted to interlock with a sliding clutch-section 14, keyed or otherwise secured to the shaft 9 and connected with a shifting lever 15, fulcrumed between its ends and adapted to throw the machine into and out of operation by engaging the sliding clutch-section with and disengaging it from the other clutch-section.

The pinion or gear 10 meshes with a similar spur gear or pinion 16 of a counter-shaft 17, journaled in a suitable bracket 18 and provided at its ends with eccentrics 19. The bracket, which is composed of sides 20 and a transverse connecting portion 21, is provided at the upper and lower ends of the said sides 20 with bearings 22 and 23, and the transverse connecting portion 21 is bolted or otherwise secured to the bar or beam 2. The lower bearings 23 receive the counter-shaft and the upper bearings 22 receive pivots 24, upon which compressor-pumps 25 are mounted. The pistons 26 of the compressor-pumps are connected with the pivot-pins of the eccentrics and are reciprocated by the rotation of the counter-shaft, the pivots permitting the compressor-pumps to have the necessary oscillation or play resulting from the direct connection of the pistons to the eccentrics. The pumps, which are adapted to compress air, are provided at their tops with check-valves 27 and are connected by flexible conduits 28, such as rubber hose, with an air-inlet pipe 29 of a tank or reservoir 30, adapted to contain water or other liquid to be sprayed. The air-inlet pipe, which is provided with two exterior arms or branches 31, consists of an upright portion or arm 32 and a horizontal portion or arm 33. The upright arm 32 depends from the top of the tank or reservoir and extends downward to within a short distance of the bottom thereof, and the horizontal branch or arm 33 is spaced from the bottom and provided with a series of apertures 34, forming jet-openings for the discharge of the air into the reservoir or tank. The horizontal arm or branch of the air-inlet pipe is arranged at the bottom to provide means for agitating the liquid to prevent sediment from collecting at that point. As the machine is drawn along the ground the pumps will be operated and compressed air will be forced into the tank or reservoir, which is provided with a suitable relief-valve 35, which is adjustable and adapted to enable the desired pressure to be maintained in the tank or reservoir.

The water or other liquid to be sprayed is introduced into the tank through an opening or manhole, which is normally closed by a cap or cover 36, preferably arranged at the top, as shown. The reservoir or tank is provided at opposite sides of the opening or manhole with suitable cocks 37 and 38, having threaded nipples and designed, respectively, for the discharge of air and water. The cock 37 for the discharge of air communicates with the interior of the tank or reservoir at a point above the surface of the liquid, and the cock 38 is provided with a depending pipe 39, extending to the bottom of the tank or reservoir and provided at its lower end with perforations or apertures 40, which are covered by a filter 41, constructed of fine wire-gauze or other suitable material and adapted to prevent the spraying devices from becoming clogged.

The water is discharged through flexible conduits, such as rubber hose, and a segmental nozzle 42 may be employed, as desired, and an atomizer 43 may also be employed and may be used simultaneously with the nozzle, if desired. When the atomizer is used simultaneously with the nozzle 42, the water discharged from the cock 38 is divided by a substantially Y-shaped coupling 44 and delivered into two separate tubes 45 and 46. The nozzle 42 is mounted on the outer end of the tube 45, and the other tube 46 is connected with either arm of the atomizer, the other arm being connected with the tube 47, extending from the cock 37. The arms of the atomizer are tubular, and the air and water are simultaneously discharged, whereby the water is divided into a fine spray, as will be readily understood. Instead, however, of arranging the tubes as just described any other desired arrangement may be employed.

The powder is preferably discharged through a substantially T-shaped nozzle 48, connected by a flexible tube 49 with a horizontal tube or passage 50, located beneath and communicating with the hopper or receptacle 51 through an aperture 52 in the bottom of the same. This hopper or receptacle, which is provided with a depending stem 53, is detachably secured to the arm or bracket 54 by means of a set-screw 55 or other suitable fastening device, whereby the hopper or receptacle may be readily removed when desired. Within the hopper or receptacle is arranged a rotary stirrer or agitator 56, consisting of radial arms 57, provided at their outer ends with shovels or blades 58 and mounted on a transverse shaft 59, journaled in suitable bearings of the hopper or receptacle. The stirrer or agitator by rotating causes the positive and continual discharge of the powder through the aperture 52 at the bottom of the receptacle or hopper, and the size of this opening is controlled to vary the flow of the powder by means of a slide 60, provided with a threaded stem 61, passing through a perforated lug or ear and engaged by a nut 62, which is adapted to move the slide in one direction. The slide is moved in the opposite direction by a spiral spring 63, disposed on the stem or screw 61, interposed between the slide and the perforated ear or lug. The shaft 59, which is extended beyond the hopper or receptacle, is supported by an arm or brace 64 and carries a pulley 65, which is connected by a belt 66 with a pulley 67. The pulley 67, which is rigid with the gear-wheel 10, is controlled by the clutch and the shifting lever heretofore described, and while these pulleys are shown grooved for the reception of the belt yet it will be readily understood that any other desired form of gearing may be employed for communicating motion from the shaft 9 to the shaft of the hopper or receptacle. The arm or brace 64, which is bolted or otherwise secured to the transverse bar or beam 2, is provided with a bearing-recess 68 for the reception of the shaft of the hopper or receptacle. The hopper or receptacle is provided with a threaded nipple 69 at the inner end of the tube or passage 50 and is connected with the cock 37 by a suitable flexible conduit, whereby air will be driven through the tube or passage and will cause the powder to be discharged with great force through the T-shaped nozzle 48. The nozzle 48 is provided at the center and at the terminals of its laterals or arms with apertures, so that the powder will be discharged forwardly and laterally.

When the hopper or receptacle is detached, a support or rest 69$^a$ may be mounted on the arm or bracket 54. The support or rest consists of a vertical bar or standard secured in the opening of the bracket or arm 54 by the set-screw 55 and provided with a horizontal supporting-bar carrying clamps 70. The clamps 70, which may be of any desired construction, preferably consist of hook-bolts provided with thumb-nuts and adapted to engage the tubes or conduits adjacent to the nozzles, whereby the latter may be supported in any desired position. The support or rest 69 may be raised or lowered, and the engaging portions of the clamp may be rotated, as will be readily understood.

It will be seen that the spraying-machine, which is simple and comparatively inexpensive in construction, is positive and reliable in operation and is adapted to spray either liquid or powder simultaneously or separately with sufficient force to enable it to be advantageously employed in the heaviest winds. The agitator of the hopper or receptacle is connected with the gearing for operating with the pumps, and the powder is positively and continuously fed to the discharge-pipe. The mechanism for effecting a discharge of powder may be readily removed from the machine, and a nozzle or nozzles may be supported in any position for the discharge of water.

Changes in the form, proportion, size, and the minor details of construction within the scope of the appended claims may be resorted to without departing from the spirit or sacrificing any of the advantages of the present invention.

Having thus described the invention, what I claim is—

1. A machine of the class described comprising a supporting-frame, wheels, a reservoir mounted on the supporting-frame, a compressor-pump for supplying the reservoir with compressed air, gearing for operating the pump connected with one of the wheels, and discharge-cocks mounted on the reservoir and communicating with the interior of the same above and below the surface of the liquid within the same, whereby compressed air or a liquid may be discharged separately and simultaneously, substantially as specified.

2. A machine of the class described comprising a frame mounted on wheels, a reservoir, a compressor-pump connected with the reservoir and operated by the wheels, and discharge-cocks connected with the interior of the reservoir at points above and below the surface of the liquid, whereby compressed air and liquid may be discharged either separately or simultaneously, substantially as described.

3. A machine of the class described comprising a frame, carrying-wheels, a reservoir mounted on the frame, means for supplying compressed air to the reservoir, discharge-cocks connected with the interior of the reservoir at points above and below the surface of the liquid, a hopper adapted to contain powder, and connections between the hopper and the air-discharge cock, substantially as described.

4. A machine of the class described comprising a reservoir, means for supplying compressed air to the same, a hopper having a discharge-tube and designed to contain a powder, cocks mounted on the reservoir and communicating with the interior of the same at points above and below the surface of the liquid, a conduit connecting the hopper with the air-discharge cock, and an agitator or stirrer mounted within the hopper, substantially as described.

5. A machine of the class described, comprising a frame, carrying-wheels, a reservoir, a pair of pivotally-mounted compressor-pumps connected with the reservoir, a shaft, journaled in suitable bearings and provided at its ends with eccentrics connected directly to the pistons of the pumps, and gearing connecting the shaft with the wheels, substantially as described.

6. A machine of the class described comprising a frame, carrying-wheels, a reservoir, a pair of pivotally-mounted compressor-pumps connected with the reservoir, a shaft provided at its ends with eccentrics pivoted directly to the pistons of the pumps, a shaft 9 having its inner end connected by gearing with said shaft, gearing connecting the outer end of the shaft 9 with one of the carrying-wheels, and a clutch for throwing the gearing into and out of operation, substantially as described.

7. A machine of the class described, comprising a supporting-frame, a bracket mounted on the supporting-fame and provided at its top and bottom with bearings, a reservoir, compressor-pumps connected with the reservoir and having pivots mounted in the top bearings of the bracket, a shaft journaled in the bottom bearings of the support and provided at its ends with eccentrics pivoted directly to the pistons of the pumps, and gearing for rotating the shafts, substantially as described.

8. A machine of the class described, comprising a frame, a reservoir, a compressor-pump connected with the reservoir, carrying-wheels, a shaft 9 mounted on the frame and receiving motion from the carrying-wheels, a gear-wheel 10 loosely mounted on the shaft and provided with a clutch-section, a pulley fixed to the gear-wheel 10, a sliding clutch-section mounted on the shaft 9 and adapted to be carried into and out of engagement with the said clutch-section to throw the machine into and out of operation, a hopper having an agitator or stirrer, a pulley connected with the agitator or stirrer, and a belt arranged on said pulleys, substantially as described.

9. In a machine of the class described, the combination with a reservoir, of a hopper provided with an aperture and having a tube or passage connected with the same and with the reservoir, a slide adapted to vary the size of the aperture and provided with a threaded stem, a lug or ear having a perforation receiving the stem, a nut engaging the threaded stem and the lug or ear, and a coil-spring interposed between the latter and the slide, substantially as described.

10. In a machine of the class described, the combination of the supporting-frame having an arm or brace provided with a bearing-recess, a hopper detachably mounted on the supporting-frame, a shaft journaled on the hopper, extended beyond the same and arranged in the said recess, a stirrer or agitator arranged within the hopper, a pulley or wheel mounted on the outer portion of the shaft, and means for rotating the same, substantially as described.

In testimony that I claim the foregoing as my own I have hereto affixed my signature in the presence of two witnesses.

EDWARD A. FRANKLIN.

Witnesses:
W. P. TIPPIT,
W. D. DAVIS.